US009967364B2

(12) United States Patent
Fix et al.

(10) Patent No.: US 9,967,364 B2
(45) Date of Patent: *May 8, 2018

(54) APPARATUS AND METHOD FOR PREDICTING AN AMOUNT OF NETWORK INFRASTRUCTURE NEEDED BASED ON DEMOGRAPHICS

(71) Applicants: AT&T Mobility II LLC, Atlanta, GA (US); AT&T Intellectual Property I, L.P., Atlanta, GA (US)

(72) Inventors: Jeremy Fix, Acworth, GA (US); Juliette Niebuhr Zerick, Alpharetta, GA (US); David Patterson, Los Altos, CA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/613,511

(22) Filed: Jun. 5, 2017

(65) Prior Publication Data
US 2017/0272535 A1    Sep. 21, 2017

Related U.S. Application Data

(63) Continuation of application No. 14/693,220, filed on Apr. 22, 2015, now Pat. No. 9,674,300.

(51) Int. Cl.
*H04W 16/00* (2009.01)
*H04L 29/08* (2006.01)
*H04L 12/24* (2006.01)

(52) U.S. Cl.
CPC .......... *H04L 67/306* (2013.01); *H04L 41/145* (2013.01); *H04W 16/00* (2013.01)

(58) Field of Classification Search
None
See application file for complete search history.

(56) References Cited

U.S. PATENT DOCUMENTS 5,884,037 A    3/1999   Aras et al.
6,125,105 A    9/2000   Edwards et al.
(Continued)

OTHER PUBLICATIONS

Lu, Yun, et al. Abstract "Massive GIS Database System with Autonomic Resource Management." Machine Learning and Applications (ICMLA), 2013 12$^{th}$ Lu 2013.
(Continued)

*Primary Examiner* — Chi H Pham
*Assistant Examiner* — Shick Hom (57) ABSTRACT

Methods, computer-readable media and apparatuses for predicting an amount of network infrastructure needed for a new neighborhood are disclosed. A processor generates a plurality of different user profiles based upon demographic data of existing customers, historical utilization data and historical usage data, determines a demographic of a new neighborhood, correlates one of the plurality of different user profiles to the new neighborhood based upon the demographic of the new neighborhood and predicts the amount of network infrastructure to be deployed in the new neighborhood based upon the one of the plurality of different user profiles that is correlated to the demographic of the new neighborhood.

20 Claims, 4 Drawing Sheets

(56) References Cited

U.S. PATENT DOCUMENTS

| | | |
|---|---|---|
| 7,274,667 B2 | 9/2007 | Mckinnon et al. |
| 7,746,789 B2 | 6/2010 | Katoh et al. |
| 7,889,677 B1 | 2/2011 | Foldvik |
| 7,917,625 B1 | 3/2011 | Cook |
| 7,958,204 B1 | 6/2011 | Phillips et al. |
| 8,015,289 B2 | 9/2011 | Hill et al. |
| 8,046,462 B2 | 10/2011 | Trappeniers et al. |
| 8,046,765 B2 | 10/2011 | Cherkasova et al. |
| 8,090,452 B2 | 1/2012 | Johnson et al. |
| 8,225,314 B2 | 7/2012 | Martins et al. |
| 8,472,339 B2 | 6/2013 | Lysejko et al. |
| 8,543,121 B2 | 9/2013 | Ryan |
| 8,644,468 B2 | 2/2014 | Dantressangle et al. |
| 8,843,978 B2 | 9/2014 | Hardin |
| 8,959,563 B2 | 2/2015 | Riedl et al. |
| 2003/0172145 A1 | 9/2003 | Nguyen |
| 2008/0080389 A1 | 4/2008 | Hart |
| 2008/0273591 A1* | 11/2008 | Brooks ................ H04N 7/1675 375/240.01 |
| 2009/0070454 A1 | 3/2009 | Mckinnon et al. |
| 2013/0275961 A1 | 10/2013 | Anderson et al. |
| 2014/0324862 A1 | 10/2014 | Bingham et al. |
| 2014/0343956 A1 | 11/2014 | Cooney et al. |
| 2015/0067168 A1 | 3/2015 | Hegdal et al. |
| 2015/0171953 A1* | 6/2015 | Djukic ................ H04B 7/15507 370/252 |

OTHER PUBLICATIONS

Wang, Lixi, et al. "Fuzzy modeling based resource management for virtualized database systems." Modeling, Analysis & Simulation of computer and Telecommunication Systems (mascots), 2011 IEEE 19$^{th}$ International symposium on. IEEE, 2011. http://citeseerx.ist.psu.edu/viewdoc/download?doi=10.1.1.220.8481&rep=rep1&type=—see section "C. Resource Allocator" on the 5$^{th}$ & 6$^{th}$ pages.

* cited by examiner

APPARATUS AND METHOD FOR PREDICTING AN AMOUNT OF NETWORK INFRASTRUCTURE NEEDED BASED ON DEMOGRAPHICS

This application is a continuation of U.S. patent application Ser. No. 14/693,220, filed Apr. 22, 2015, now U.S. Pat. No. 9,674,300, which is herein incorporated by reference in its entirety.

The present disclosure relates generally to deploying network infrastructure and, more particularly, to an apparatus, method and a computer-readable medium for predicting an amount of network infrastructure needed based on demographics.

BACKGROUND

Previously, network infrastructure investment and deployment were based historical data that was backwards looking. For example, past usage was used to extrapolate usage in the future regardless of the users or individuals. However, the types of services used by individuals and the types of individuals within a neighborhood can evolve over time. Thus, attempting to determine an amount of network infrastructure needed for a new neighborhood using an average that is based on generic historical data may be inaccurate in predicting the amount of network infrastructure that may be needed in the new neighborhood.

SUMMARY

In one example, the present disclosure discloses a method, computer-readable medium, and apparatus for predicting an amount of network infrastructure needed for a new neighborhood. For example, the method may include a processor that generates a plurality of different user profiles based upon demographic data of existing customers, historical utilization data and historical usage data, determines a demographic of a new neighborhood, correlates one of the plurality of different user profiles to the new neighborhood based upon the demographic of the new neighborhood and predicts the amount of network infrastructure to be deployed in the new neighborhood based upon the one of the plurality of different user profiles that is correlated to the demographic of the new neighborhood.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for predicting an amount of network infrastructure needed for a new neighborhood based on demographics. As discussed above, network infrastructure investment and deployment were previously based on historical data that was backwards looking. For example, past usage was used to extrapolate usage in the future regardless of the users or individuals. However, the types of services used by individuals and the types of individuals within a neighborhood can evolve over time. Thus, attempting to determine an amount of network infrastructure needed for a new neighborhood using an average that is based on generic historical data may be inaccurate in predicting the amount of network infrastructure that may be needed in the new neighborhood.

One embodiment of the present disclosure allows a network service provider to predict an amount of network infrastructure needed based on demographics of a new neighborhood. For example, usage patterns of existing customers may be collected and analyzed to generate a plurality of different user profiles for different demographic groups. Each one of the user profiles may be transformed into data regarding an amount of one or more different network elements that may be needed for a network infrastructure that may be deployed in a new neighborhood that has a similar demographic as one of the user profiles.

In addition, the value of each user associated with the identified user profile may be calculated and compared to the cost of deploying the necessary amounts of network elements in the network infrastructure for the new neighborhood. If the value is greater than the costs, a recommendation may be made to proceed with deployment of the necessary network elements for the network infrastructure.

Figure 1:
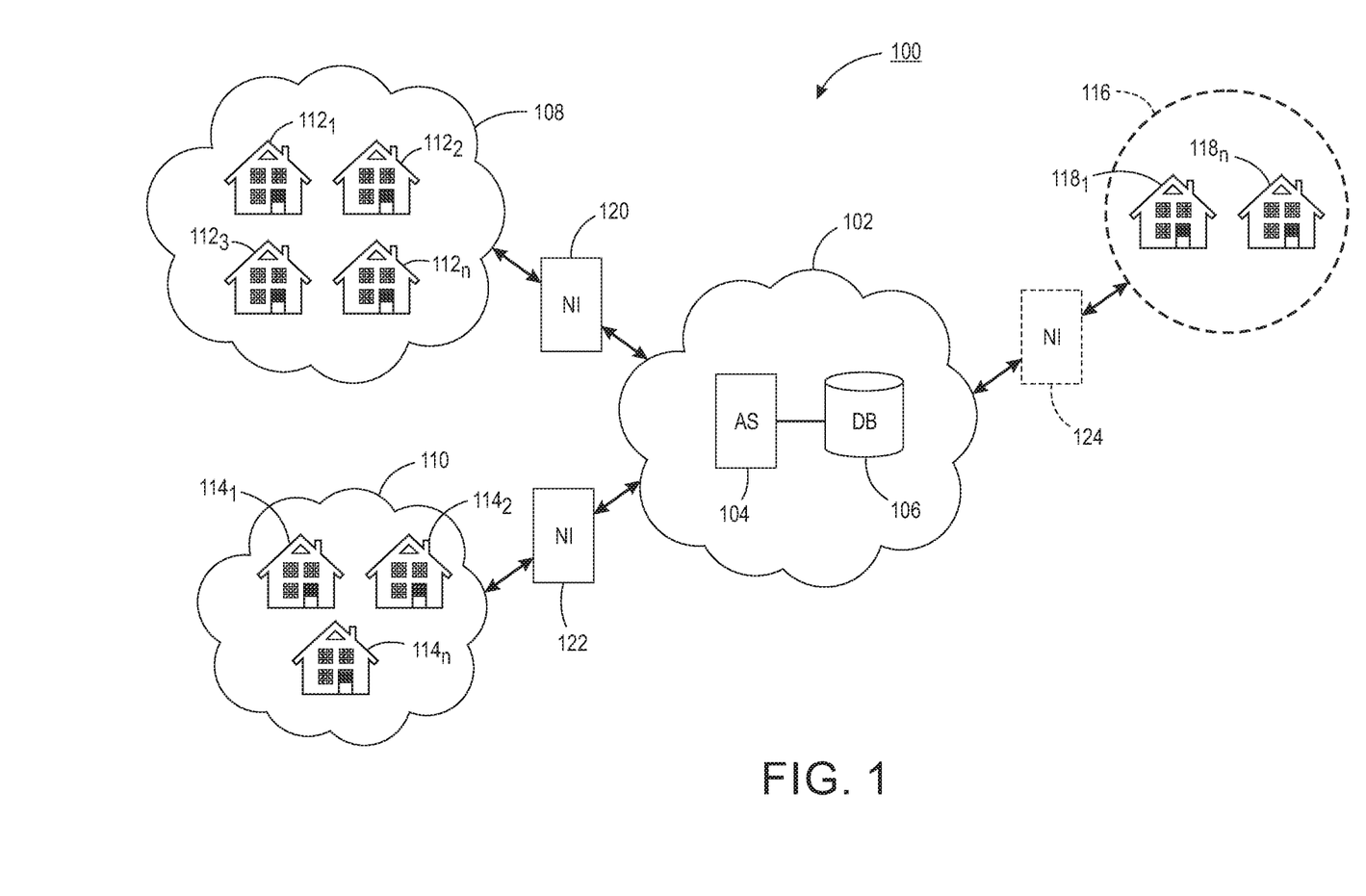
FIG. 1 illustrates an example network related to the present disclosure.

To aid in understanding the present disclosure, FIG. 1 illustrates a communication network 100. In one embodiment, the communication network 100 may include an Internet Protocol (IP) network 102. The IP network 102 may include an application server (AS) 104 and a database (DB) 106. Although only a single AS 104 and a single DB 106 is illustrated in FIG. 1, it should be noted that any number of application servers and databases may be deployed.

Figure 4:
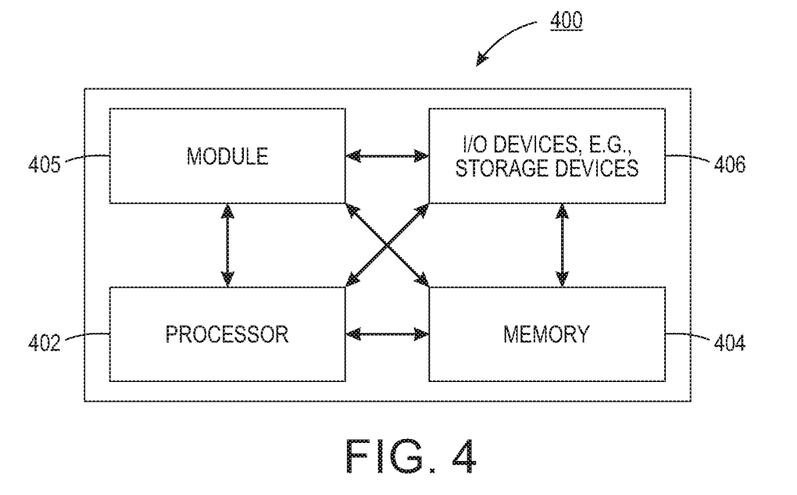
FIG. 4 illustrates a high-level block diagram of a computer suitable for use in performing the functions described herein.

In one embodiment, the AS 104 may be deployed as a computer having a processor and a memory as illustrated in FIG. 4 and discussed below. In one embodiment, the AS 104 may be configured to perform the functions described below.

In one embodiment, the DB 106 may store a variety of user data that is used to generate user profiles. The user profiles may then also be stored in the DB 106. In one embodiment, the user data may include a user demographic data (e.g., user age, gender, income, marital status, profession, location, race, and the like), service usage history (e.g., which services of the service provider that the user is subscribed to, such as, video, Internet, landline telephone, wireless telephone, home security services, and the like), service utilization history (e.g., how much of each one of the services that the user uses) and household demographic data (e.g., who are the members in the user's household and each one of the members' demographic data).

In one embodiment, the DB 106 may also store information regarding cost to deploy each one of a plurality of different network elements needed for a network infrastructure. For example, the costs to deploy a network element may include a cost of the network element, a cost to install the network element, a cost to maintain the network element, a cost to operate the network element, and the like.

It should be noted that the IP network 102 has been simplified for ease of explanation. The IP network 102 may include additional network elements that are not shown, such as for example, a gateway (e.g., a serving gateway, a packet data network gateway, and the like), a firewall, a call control element, one or more access networks, an authentication, authorization and accounting server, a home subscriber server, a mobility management entity, and the like. In one embodiment, the IP network 102 may be a cellular communication network (e.g., a 3G, 4G, LTE, and the like).

In one embodiment, the communication network 100 may also include existing neighborhoods 108 and 110. In one embodiment, the existing neighborhoods 108 and 110 may be in different geographic locations. In one embodiment, a "neighborhood" may be defined as a single building (e.g., a commercial building or apartment building), a single housing development, a single school district, a single town or city, a single state, and the like. Although two existing neighborhoods 108 and 110 are illustrated in FIG. 1 by example, it should be noted that any number of neighborhoods may be deployed.

In one embodiment, the existing neighborhoods 108 and 110 may have a corresponding network infrastructure (NI) 120 and 122, respectively. The network infrastructure 120 and 122 may include one or more of a plurality of different network elements (e.g., border elements, gateways, cellular towers, fiber lines, firewalls, routers, switches, and the like).

In one embodiment, the existing neighborhood 108 may include one or more users $112_1$ to $112_n$ (herein referred to collectively as users 112 or individually as a user 112) and the existing neighborhood 110 may include one or more users $114_1$ to $114_n$ (herein referred to collectively as users 114 or individually as a user 114). In one embodiment, the AS 104 may collect information about the users 112 and 114 to generate one or more user profiles. For example, the AS 104 may collect user demographic data (e.g., user age, gender, income, marital status, profession, location, race, and the like), service usage history (e.g., which services of the service provider the user is subscribed to, such as, video, internet, landline telephone, wireless telephone, home security services, and the like), service utilization history (e.g., how much of each one of the services the user uses) and household demographic data (e.g., who are the members in the user's household and each one of the members demographic data).

Based on the information that is collected, one or more user profiles may be generated for the existing neighborhoods 108 and 110. In one example, the user profiles may be based upon an average of the data collected for the users 112 and 114 within the existing neighborhoods 108 and 110, respectively. In another example, the user profiles may be based upon a normal Gaussian distribution of the data. For example, a user profile 1 of the existing neighborhood 108 may be determined to be mostly married families who are between the ages of 30-40 with two children under the age of 12. Most of the families are service professionals with an average household income of $100,000 a year. User profile 1 predicts that the user will only subscribe to cable, Internet and wireless telephone services. In addition, a particular type and amount of network elements will be needed to support X amount of cable, Y amount data for Internet services and Z amount of wireless telephone services for user profile 1.

In another example, a user profile 2 of the existing neighborhood 110 may be determined to be mostly single males who are between the ages of 20-30. The average user is an hourly wage worker with a household income of $50,000 a year. This particular user profile predicts that the user will only subscribe to Internet and wireless telephone services. User profile 2 predicts that the user will only subscribe to Internet and wireless telephone services. In addition, a particular type and amount of network elements will be needed to support A amount data for Internet services and B amount of wireless telephone services for user profile 2.

In one embodiment, the user profiles 1 and 2 may be used to predict an amount of network infrastructure 124 needed for a new neighborhood 116 having users $118_1$ to $118_n$. The term "new neighborhood" may be defined as being "new" to the service provider. For example, the new neighborhood 116 may have existed, but without any network infrastructure 124 from the service provider. In another example, the term "new neighborhood" may be defined as being a newly constructed building, housing development, town, city and the like.

In one embodiment, user demographic data and household demographic data may be collected for the users 118 of the new neighborhood 116. The demographic data may then be compared to the user profiles (e.g., user profiles 1 and 2) to determine, which user profile most closely matches the demographic data of the new neighborhood 116. Based on the user profile that most closely matches the demographic data of the new neighborhood 116, a prediction may be made on an amount of network infrastructure that is needed for the new neighborhood 116. A recommendation may be made on whether the new network infrastructure 124 should be deployed or not based on estimated revenue associated with the network usage of the user profile that matches the demographic data of the new neighborhood 116.

Figure 2:
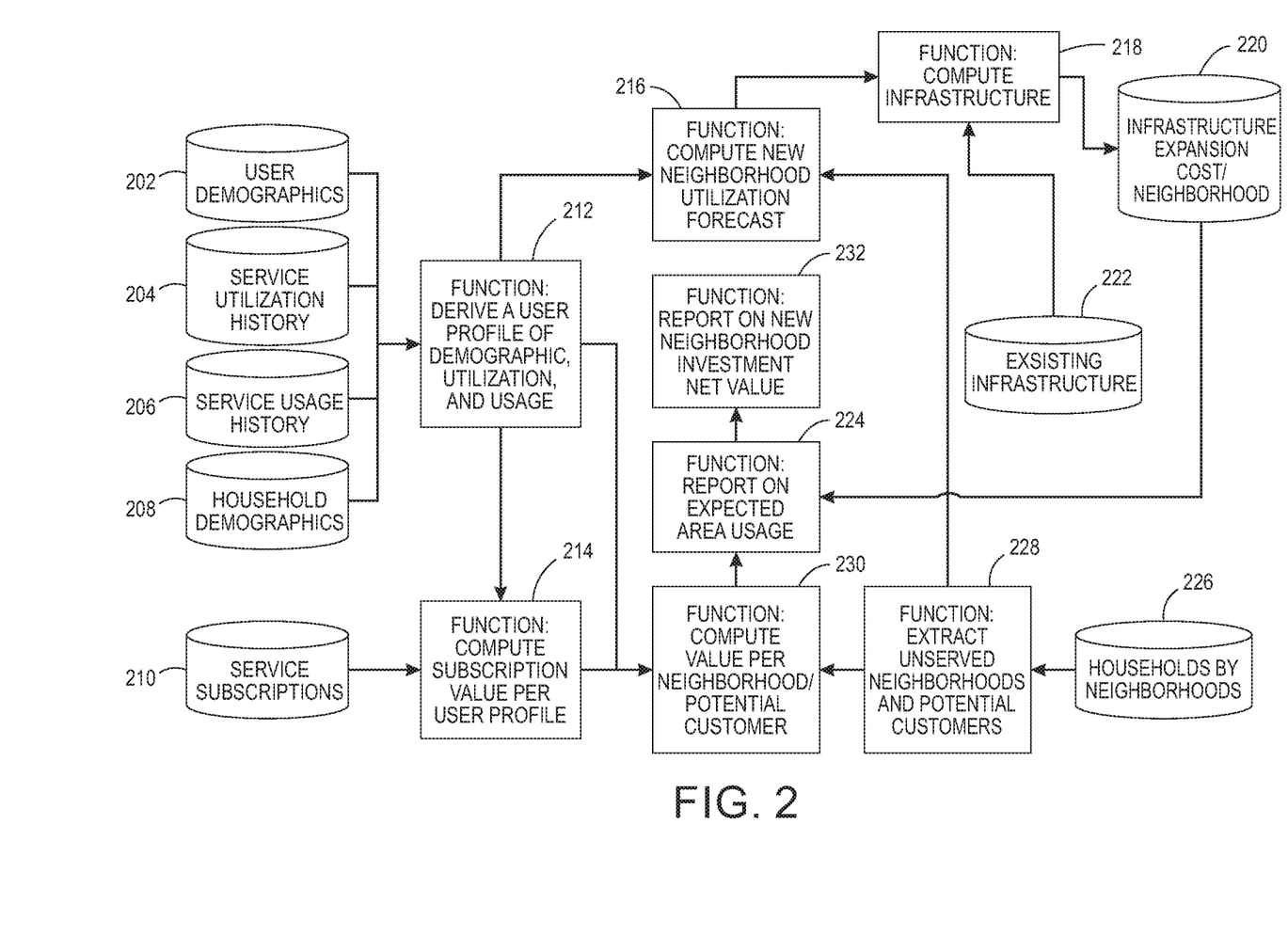
FIG. 2 illustrates an example block diagram of the present disclosure.

FIG. 2 illustrates an example block diagram of how the amount of network infrastructure is predicted. As discussed above, a database 202 may store user demographics, a database 204 may store service utilization history, a database 206 may store service usage history and a database 208 may store household demographics. The collected information may then be used to derive a user profile at block 212.

In one embodiment, at block 216, a new neighborhood utilization forecast may be calculated. As discussed above, the demographic data of the new neighborhood may be collected and compared to the generated user profiles from block 212. The user profile may provide a prediction regarding which services that the user will subscribe to and how much of each service the user will use. The user profile that most closely matches the demographic data of the new neighborhood may be used to calculate the new neighborhood utilization forecast.

In one embodiment, the new neighborhood utilization forecast may be used to compute an amount of network infrastructure that is needed for the new neighborhood at block 218. In one embodiment, a database 222 that stores information regarding existing network infrastructures may be used to compute the amount of infrastructure that is needed in the new neighborhood.

A database 220 may store a cost associated with each one of a plurality of different network elements that may be deployed in the network infrastructure. The information may be used with the amount of network infrastructure that is needed for the new neighborhood to calculate a report on expected area usage at block 224. The report on expected area usage at block 224 may include a cost associated with deploying the amount of network infrastructure for the new neighborhood.

In one embodiment, a database 210 may be used to store information related to service subscriptions. For example, the database 210 may be used to obtain information related to how much revenue each service subscription generates. At block 214, the service subscription information may be used with the user profiles generated at block 212 to compute a subscription value per user profile. In other words, based upon the predicted services that are subscribed to and an amount each service is used according to the user profiles, each user profile may be associated with a subscription value or an amount of revenue that is generated.

In one embodiment, a database 226 may be used to identify households by neighborhoods. At block 228, the information from the database 226 may be used to identify un-served neighborhoods and potential customers (e.g., new neighborhoods). In one embodiment, the subscription value per user profile from block 214 may then be used to compute a potential value per un-served neighborhoods/potential customers.

In one embodiment, the subscription value of un-served neighborhoods/potential customers calculated in block 230 may be combined with the report on expected area usage in block 224 to generate a report on new neighborhood investment net value in block 232. For example, the report on new neighborhood investment net value may be subscription value of un-served neighborhoods/potential customers calculated in block 230 less the cost associated with the amount of network infrastructure required for the expected area usage calculated in block 224.

In one embodiment, if the report on new neighborhood investment net value is positive, the AS 104 may generate a recommendation that the investment to deploy the amount of network infrastructure in the new neighborhood 116 should proceed. However, if the report on new neighborhood investment net value is negative, the AS 104 may generate a recommendation that the investment to deploy the amount of network infrastructure in the new neighborhood 116 should not proceed.

Figure 3:
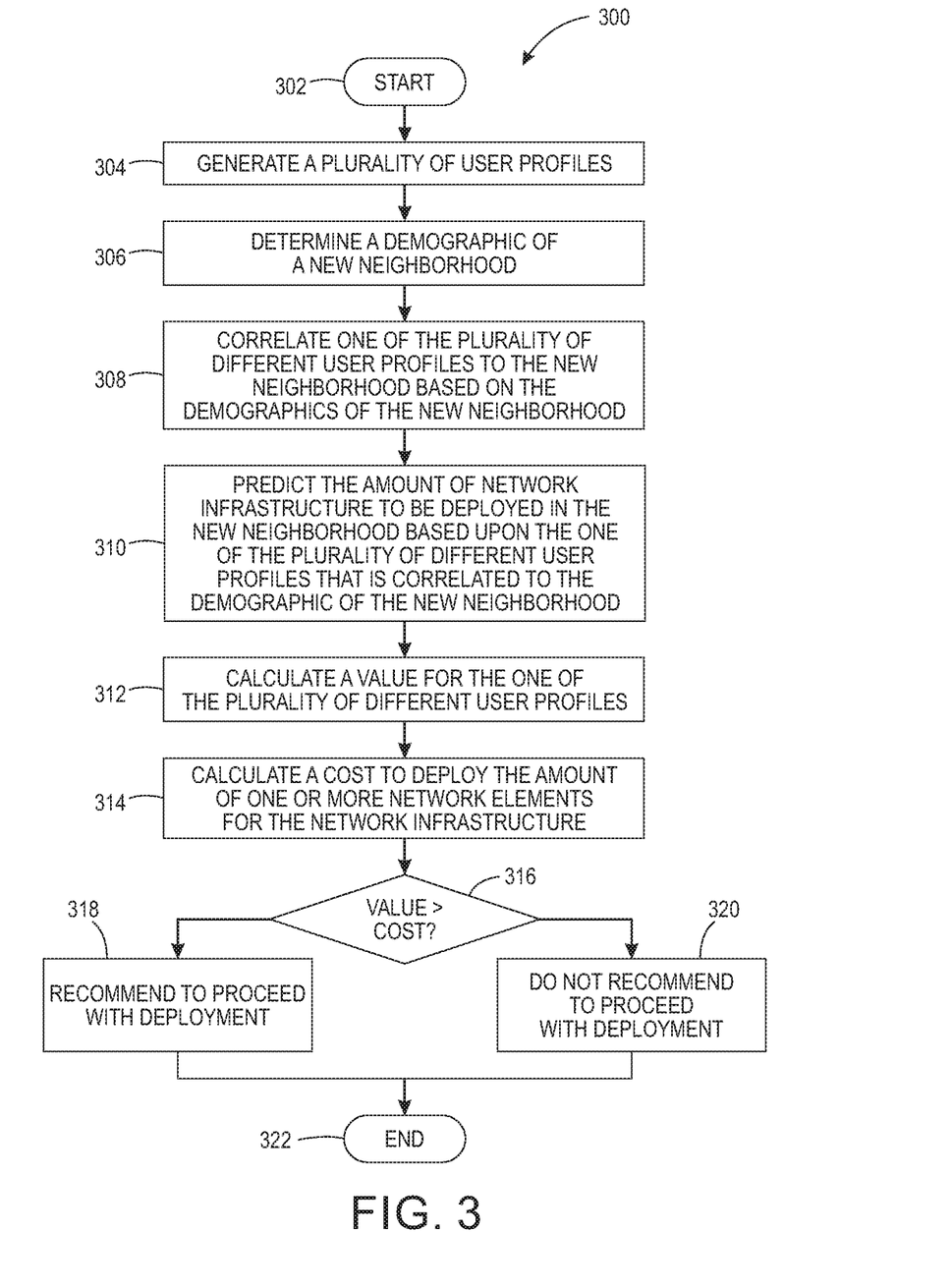
FIG. 3 illustrates a flowchart of an example method for predicting an amount of network infrastructure needed for a new neighborhood based on demographics.

FIG. 3 illustrates a flowchart of a method 300 for predicting an amount of network infrastructure needed for a new neighborhood based on demographics in accordance with the present disclosure. In one embodiment, steps, functions and/or operations of the method 300 may be performed by an AS 104. In one embodiment, the steps, functions, or operations of method 300 may be performed by a computing device or system 400, and/or processor 402 as described in connection with FIG. 4 below. For illustrative purpose, the method 300 is described in greater detail below in connection with an embodiment performed by a processor, such as processor 402.

The method 300 begins in step 302. At step 304, a processor generates a plurality of user profiles. For example, information related to the users within an existing neighborhood may be collected to generate the plurality of user profiles. In one example, the information may include user demographic data (e.g., user age, gender, income, marital status, profession, location, race, and the like), service usage history (e.g., which services of the service provider the user is subscribed to, such as, video, internet, landline telephone, wireless telephone, home security services, and the like), service utilization history (e.g., how much of each one of the services the user uses) and household demographic data (e.g., who are the members in the user's household and each one of the members demographic data).

At step 306, the processor determines a demographic of a new neighborhood. For example, the new neighborhood may be a neighborhood that exists, but has not services from a service provider. In other words, the service provider may want to deploy a network infrastructure in the "new neighborhood" to obtain potentially new customers. The demographic of the new neighborhood may be obtained from census data, tax records, and the like.

At step 308, the processor correlates one of the plurality of different user profiles to the new neighborhood based upon the demographic of the new neighborhood. For example, the user profile that most closely matches the demographic information of the new neighborhood may be used to predict the amount of network infrastructure needed for the new neighborhood.

At step 310, the processor predicts the amount of network infrastructure to be deployed in the new neighborhood based upon the one of the plurality of different user profiles that is correlated to the demographic of the new neighborhood. For example, each one of the plurality of different user profiles may provide predictions regarding what type of services the user will most likely subscribe to and how much of each service the user will most likely use. Based on the user profile that is correlated, the amount of network infrastructure to be deployed in the new neighborhood may be predicted.

At step 312, the processor calculates a value for the one of the plurality of different user profiles. For example, based upon the services and the amount of services that are predicted by the user profile, an amount of revenue generated for the user profile may be calculated.

At step 314, the processor calculates a cost to deploy the amount of one or more network elements for the network infrastructure. For example, the amount of network infrastructure that should be deployed may include an amount of one or more network elements. The amount of each one of the different network elements may be calculated based upon the amount of network infrastructure that is needed. In addition, a cost associated with each one of the different network elements that are needed may be calculated (e.g., cost of equipment, cost of installation, cost of maintenance, cost of operation, and the like).

At step 316, the processor determines if the value is greater than the cost. If the value is greater than the cost, then the method 300 may proceed to step 318.

At step 318, the processor may generate a recommendation to proceed with the deployment. The method then proceeds to step 322.

Referring back to step 316, if the processor determines that the value is not greater than the cost, the method 300 proceeds to step 320. At step 320, the processor generates a recommendation to not proceed with the deployment. The method 300 then proceeds to step 322. At step 322, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

As such, the present disclosure provides at least one advancement in the technical field of communication networks. This advancement allows for predicting an amount of network infrastructure needed for a new neighborhood based on demographics. The present disclosure also provides a transformation of data. For example, user profiles generated based on demographic data, historical utilization data and historical usage data is transformed into a prediction of an amount of network infrastructure to be deployed in a new neighborhood.

Finally, embodiments of the present disclosure improve the functioning of a computing device, e.g., a server, a base station, an eNodeB and/or a UE. For example, an application server dedicated for predicting an amount of network infrastructure needed for a new neighborhood based on demographics that was not previously available.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for predicting an amount of network infrastructure needed for a new neighborhood based on demographics, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for predicting an amount of network infrastructure needed for a new neighborhood based on demographics (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for predicting an amount of network infrastructure needed for a new neighborhood based on demographics (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for predicting an amount of network infrastructure needed for a new neighborhood, the method comprising:
    generating, by a processor, a plurality of different user profiles based upon demographic data of existing customers, historical utilization data and historical usage data;
    determining, by the processor, a demographic of the new neighborhood;
    correlating, by the processor, one of the plurality of different user profiles to the new neighborhood based upon the demographic of the new neighborhood; and
    predicting, by the processor, the amount of network infrastructure to be deployed in the new neighborhood based upon the one of the plurality of different user profiles that is correlated to the demographic of the new neighborhood.

2. The method of claim 1, wherein the amount of network infrastructure comprises an amount of each one of one or more different network elements.

3. The method of claim 2, further comprising:
    calculating, by the processor, a value for the one of the plurality of different user profiles;
    calculating, by the processor, a cost to deploy the amount of the each one of the one or more different types of network elements for the network infrastructure; and
    recommending, by the processor, to proceed with a deployment of the network infrastructure in the new neighborhood when the value is greater than the cost.

4. The method of claim 1, wherein the demographic data comprises user demographic data.

5. The method of claim 4, wherein the user demographic data comprises at least one of: an age, a household income, an occupation, a gender, a race or a geographic location.

6. The method of claim 1, wherein the demographic data comprises household demographic data.

7. The method of claim 6, wherein the household demographic data comprises how many people are in a household and demographic data for each person in the household.

8. The method of claim 1, wherein the predicting further comprises:
   determining, by the processor, which types of services are used and an amount of each one of the services that is used by the one of the plurality of different profiles correlated to the new neighborhood;
   determining, by the processor, one or more different types of network elements required to support the types of services and the amount of the each one of the services that is used; and
   calculating, by the processor, an amount of each one of the one or more different types of network elements to support the types of services and the amount of the each one of the services that is used.

9. A tangible computer-readable medium storing instructions which, when executed by a processor, cause the processor to perform operations for predicting an amount of network infrastructure needed for a new neighborhood, the operations comprising:
   generating a plurality of different user profiles based upon demographic data of existing customers, historical utilization data and historical usage data;
   determining a demographic of the new neighborhood;
   correlating one of the plurality of different user profiles to the new neighborhood based upon the demographic of the new neighborhood; and
   predicting the amount of network infrastructure to be deployed in the new neighborhood based upon the one of the plurality of different user profiles that is correlated to the demographic of the new neighborhood.

10. The tangible computer-readable medium of claim 9, wherein the amount of network infrastructure comprises an amount of each one of one or more different network elements.

11. The tangible computer-readable medium of claim 10, the operations further comprising:
   calculating a value for the one of the plurality of different user profiles;
   calculating a cost to deploy the amount of the each one of the one or more different types of network elements for the network infrastructure; and
   recommending to proceed with a deployment of the network infrastructure in the new neighborhood when the value is greater than the cost.

12. The tangible computer-readable medium of claim 9, wherein the demographic data comprises user demographic data.

13. The tangible computer-readable medium of claim 12, wherein the user demographic data comprises at least one of: an age, a household income, an occupation, a gender, a race or a geographic location.

14. The tangible computer-readable medium of claim 9, wherein the demographic data comprises household demographic data.

15. The tangible computer-readable medium of claim 14, wherein the household demographic data comprises how many people are in a household and demographic data for each person in the household.

16. The tangible computer-readable medium of claim 9, wherein the predicting further comprises:
   determining which types of services are used and an amount of each one of the services that is used by the one of the plurality of different profiles correlated to the new neighborhood;
   determining one or more different types of network elements required to support the types of services and the amount of the each one of the services that is used; and
   calculating an amount of each one of the one or more different types of network elements to support the types of services and the amount of the each one of the services that is used.

17. An apparatus for predicting an amount of network infrastructure needed for a new neighborhood, the apparatus comprising:
   a processor; and
   a computer-readable storage device storing a plurality of instructions which, when executed by the processor, cause the processor to perform operations, the operations comprising:
      generating a plurality of different user profiles based upon demographic data of existing customers, historical utilization data and historical usage data;
      determining a demographic of the new neighborhood;
      correlating one of the plurality of different user profiles to the new neighborhood based upon the demographic of the new neighborhood; and
      predicting the amount of network infrastructure to be deployed in the new neighborhood based upon the one of the plurality of different user profiles that is correlated to the demographic of the new neighborhood.

18. The apparatus of claim 17, wherein the amount of network infrastructure comprises an amount of each one of one or more different network elements.

19. The apparatus of claim 18, the operations further comprising:
   calculating a value for the one of the plurality of different user profiles;
   calculating a cost to deploy the amount of the each one of the one or more different types of network elements for the network infrastructure; and
   recommending to proceed with a deployment of the network infrastructure in the new neighborhood when the value is greater than the cost.

20. The apparatus of claim 17, wherein the predicting further comprises:
   determining which types of services are used and an amount of each one of the services that is used by the one of the plurality of different profiles correlated to the new neighborhood;
   determining one or more different types of network elements required to support the types of services and the amount of the each one of the services that is used; and
   calculating an amount of each one of the one or more different types of network elements to support the types of services and the amount of the each one of the services that is used.

* * * * *